United States Patent

[11] 3,609,584

[72] Inventors: Malcolm L. Stitch; Walter Koechner, both of Malibu, Calif.
[21] Appl. No. 10,401
[22] Filed Feb. 11, 1970
[45] Patented Sept. 28, 1971
[73] Assignee Union Carbide Corporation New York, N.Y.

[54] METHOD AND MEANS FOR COMPENSATING THERMAL LENSING IN A LASER SYSTEM
7 Claims, 3 Drawing Figs.

[52] U.S. Cl. .................................... 331/94.5, 350/175 GN
[51] Int. Cl. ........................................ H01s 3/00
[50] Field of Search ............................ 331/94.5; 350/96 WG, 160, 175 GN, 179

[56] References Cited
UNITED STATES PATENTS
| | | | |
|---|---|---|---|
| 3,399,012 | 8/1968 | Peters............................ | 360/96 |
| 3,484,714 | 12/1969 | Koester et al................. | 331/194.5 |
| 3,531,185 | 9/1970 | Bucksbaum.................. | 350/179 |

OTHER REFERENCES
Akhmanov et al., IEEE Jour. of Quantum Electronics, Vol. QE-4, pp. 568–575, Oct. 1968

Primary Examiner—Ronald L. Wibert
Assistant Examiner—Edward S. Bauer
Attorney—Pastoriza & Kelly ABSTRACT: A negative thermal circular lens is provided for compensating the thermal lensing effect inherent in output radiation generated by a solid-state laser rod of the annular configuration. The compensating thermal lens is of annular construction with metallic coatings on its inner and outer cylindrical surfaces. These coatings are heated by RF energy to develop a thermal gradient in the direction to induce stress resulting in a negative lensing effect so that the positive lensing effect in the annular laser output beam is substantially canceled.

This invention relates generally to a method and means for compensating thermal lensing in a laser system and more particularly to the compensation of laser radiation generated by solid-state-annular-type laser rods.

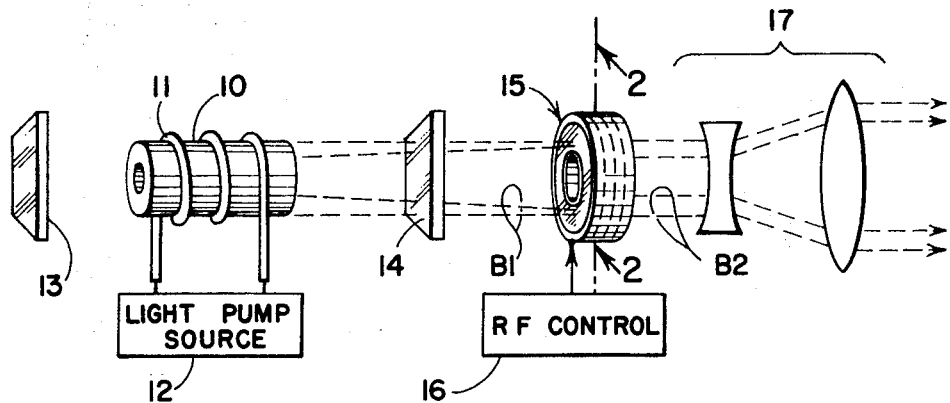
FIG. 1
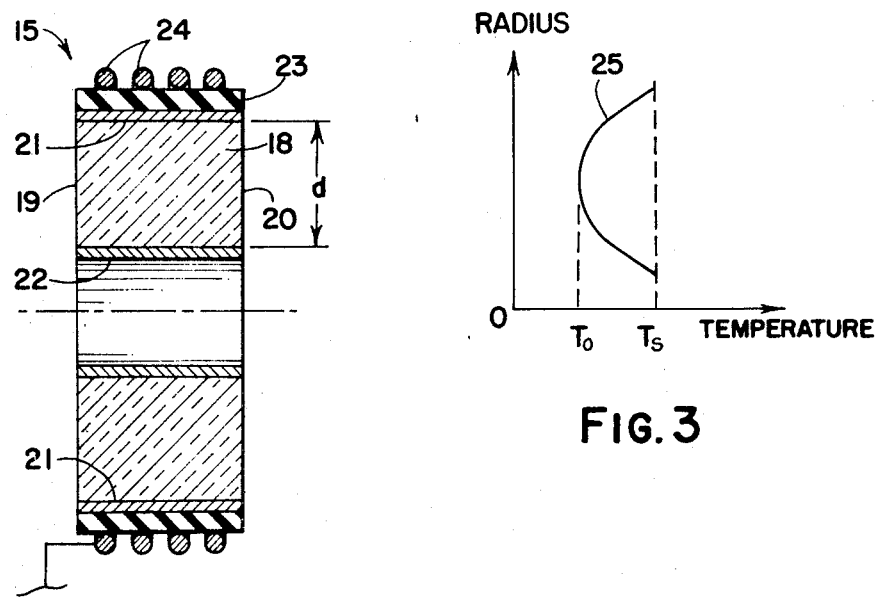
FIG. 2
FIG. 3
INVENTORS:
WALTER KOECHNER
MALCOLM L. STITCH
BY Pastoriza & Kelly
ATTORNEYS

METHOD AND MEANS FOR COMPENSATING THERMAL LENSING IN A LASER SYSTEM

BACKGROUND OF THE INVENTION

Under the influence of optical pumping, thermal gradients are introduced in crystalline and glass-type laser materials. The change in temperature within a laser rod causes a thermal distortion of the laser beam due to a temperature and stress dependent variation of the refractive index. In addition, the stresses cause an elongation of the rod. As a result of these effects, the laser rods exhibit thermal lensing; that is, the output beam converges in a generally positive manner the same as though uniform radiation were passed through a convex lens.

In many applications, a beam-expanding telescope is required to decrease the beam divergence of the system. The positive thermal lensing effect exhibited by a solid laser rod can be compensated for by adjusting the separation of the two lenses of the telescope. Such an adjustment is possible because thermal lensing in a solid rod can be compensated for by a negative spherical lens, at least to a first-order approximation.

However, for certain special applications, laser rods such as those formed from ruby are of an annular configuration defining essentially inner and outer cylindrical surfaces. In the case of such an annular rod, the thermal lensing resulting is equivalent to the focusing properties of a doughnut-shaped positive lens, referred to generally as a positive circular lens. Accordingly, the compensating optical device has to be a negative circular (doughnut-shaped) lens. Such a negative-type circular lens having nonspherical surfaces is extremely difficult to fabricate in an optical shop.

BRIEF DESCRIPTION OF THE PRESENT INVENTION

With the foregoing in mind, the present invention contemplates a method and means for compensating thermal lensing in annular-type laser devices which avoids the necessity of fabricating nonspherical surfaces.

More particularly, the invention comprises a cylindrical body having optically flat opposite end surfaces. This body is provided with a heating means thermally coupled to the body for developing a thermal gradient which creates a lens effect constituting the opposite of the lens effect inherent in the laser radiation. By this means, not only can the desired compensation be realized but the negative thermal circular lens itself is "thermally tunable" in that its focal length may be varied by controlling the degree of heat supplied to the lens.

BRIEF DESCRIPTION OF THE DRAWING

A better understanding of the invention will be had by referring to the accompanying drawings in which:

FIG. 1 is a schematic showing of a laser system with which the negative thermal circular lens of the present invention is used for eliminating lens effect inherent in the output radiation from the system prior to passing into an expanding lens system;

FIG. 2 is an enlarged cross section of the negative circular lens taken in the direction of the arrows 2—2 of FIG. 1; and, FIG. 3 illustrates the temperature variation with radial distance changes from the annular central portion of the lens body of FIG. 2 towards its outer and inner cylindrical surfaces.

DETAILED DESCRIPTION OF THE PREFERRED EMBODIMENT

Referring to FIG. 1 there is shown a laser rod 10 with a central opening defining an annular configuration. The rod 10 is light pumped by an helical flashlamp 11 powered from a source 12. Suitable end mirrors 13 and 14 in optical alignment with the rod 10 define the optical cavity for the laser. Light pumping of the rod 10 by the flashlamp 11 builds up an inverted population level in the laser ions in the rod and at threshold, the laser ions in the upper energy level fall back to a lower level resulting in simulated emission of radiation which is enhanced through regenerative action taking place between the end mirrors 13 and 14. The end mirror 14 may be partially transmissive in order to couple the beam out of the optical cavity.

Normally, the annular laser rod 10 and helical flashlamp 11 are surrounded by an enclosure or "head" through which cooling liquid is circulated. The cooling of the rod is effected at both the inner and outer cylindrical surfaces resulting in a temperature gradient which decreases from the annular central portion of the laser rod body in radial directions towards the inner and outer cylindrical surfaces. This change in temperature, as described heretofore, causes a thermal distortion of the laser beam due to the stress dependent variation of the refractive index and further stresses resulting in an elongation of the rod. As a consequence, the annular output laser beam exhibits a positive lensing effect as indicated at B1 in FIG. 1.

In accord with the present invention, a negative thermal circular lens 15 is introduced in optical alignment with the output annular beam B1. Heating control of the compensating circular lens 15 is effected by an RF control 16 to induce a negative lensing effect in the circular lens 15 thereby resulting in cancellation of the positive lensing effect to provide a compensated output beam B2. This beam may then be passed through a conventional beam extending lens system or telescope 17 to decrease the beam divergence of the system.

FIG. 2 illustrates details of the preferred embodiment of the negative circular lens 15 of FIG. 1. As shown, the compensating lens comprises a cylindrical member 18 having optically flat end surfaces 19 and 20 and a central opening to define an annular body. This body is dimensioned to intercept the annular laser beam B1 when the device is used with the laser system of FIG. 1.

The outer and inner cylindrical surfaces are provided with metallic coatings 21 and 22 which may constitute gold. An insulating material 23 surrounds the outer coating 21 as shown. The insulation coating 23 supports a plurality of RF coils 24 supplied with radiofrequency energy from the RF control 16 of FIG. 1.

FIG. 3 illustrates at 25 the temperature gradient developed in the body 18 of FIG. 2 when the cylindrical surfaces are heated. As shown, the temperature is minimum at the annular central portion of the body and increases radially outwardly towards the outer and inner cylindrical surfaces.

OPERATION

In operation, the negative circular thermal lens 15 is positioned in optical alignment with the output radiation as illustrated in FIG. 1. Radiofrequency energy is then supplied to the coils 24 to establish an RF field electromagnetically coupled to the coatings. The coatings themselves will generate heat at the cylindrical surfaces of the body because of the dielectric losses in the coatings. In this respect, the outer coating 21 is adjusted in thickness so as to allow the RF field to penetrate to the inner coating 22.

The heat generated in the two metallic coatings will cause a thermal lens effect in the body 18 as a consequence of the thermal gradient as described in FIG. 3. This thermal gradient changes the optical path length according to the following equation:

$\Delta P = d\Delta n + (n-1)\Delta d$ where $d$ is the thickness of the disc and $n$ is the index of refraction. The second term in the above equation takes into account the thermal elongation of the disc.

$\Delta n$ represents the total change in the index of refraction. This change in the index of refraction arises from two different effects: the first is a temperature-dependent change of index of refraction and the second is a stress-dependent change of the index of refraction. With a disc of outside diameter of 1.3 centimeters and inside diameter of 0.63 of the outside diameter, and of length equal to 5 millimeters, a thermal gradient of 100° Centigrade can be generated between the outer and inner cylindrical surfaces. Under these conditions, an effective negative focal length of about −4 meters results. This negative lensing can be used to compensate for the positive thermal lensing of the laser rod of FIG. 1.

By adjusting the degree of heating and thus the temperature gradient, the focal length of the circular compensating lens can be varied to accommodate different positive lensing effects in various laser rods. When the negative thermal lens is used, conventional optics can then be employed for the beam expanding telescope.

Waht is claimed is:

1. A method of compensating thermal lensing in a laser system comprising the steps of:
   a. passing laser radiation from said system through a lens material; and
   b. heating said lens material to thereby develop a thermal gradient therein which creates a lens effect constituting the opposite of the lens effect characterizing said laser radiation.

2. The method of claim 1, including the steps of varying the heating supplied to said lens to thereby vary the focal length of the created lens effect so that it may be adjusted to compensate for changes in the lens effect characterizing said laser radiation.

3. A thermal lens for compensating the lens effect inherent in laser radiation comprising, in combination:
   a. a cylindrical lens body having opposite flat end surfaces; and
   b. heating means thermally coupled to said body for developing a thermal gradient which creates a lens effect constituting the opposite of said lens effect inherent in said laser radiation.

4. A thermal lens according to claim 3, in which said heating means includes: at least one metallic coating on the peripheral portions of said body; and a plurality of RF coils in electromagnetic coupling relationship with said coating whereby heat is developed in said coating by said RF coils.

5. A thermal lens according to claim 4, including means for adjusting the RF field strength generated by said coils to thereby control the degree of heating of said coating so that the thermal lens effect created in said body can be varied to vary the effective focal length of the thermal lens.

6. A laser system comprising, in combination:
   a. a solid-state laser rod of annular configuration defining inner and outer cylindrical surfaces;
   b. light-pumping means for said rod;
   c. end mirrors defining an optical cavity so that stimulated emission of radiation can take place, said radiation being in the form of an annular beam exhibiting a positive lensing effect as a consequence of heating of said rod by said light-pumping means; and
   d. a negative thermal circular lens positioned in optical alignment with said annular beam comprising:
      1. a cylindrical member having flat end surfaces and a central opening to define an annular body dimensioned to intercept said annular beam;
      2. metallic coatings on the outer and inner cylindrical surfaces of said body;
      3. an outer cylindrical covering of insulating material overlying the coating on the outer cylindrical surface;
      4. a plurality of RF coils surrounding said insulating material; and
      5. RF generating means connected to said coils for establishing an RF field electromagnetically coupled to said coatings to heat the same to establish a thermal gradient on said body in a direction to induce stress resulting in a negative lensing effect
   whereby said positive lensing effect of said annular beam is substantially cancelled.

7. A laser system according to claim 6, in which the temperature gradient of said annular laser rod is from its annular central portion radially outwardly towards its inner and outer cylindrical surfaces and the temperature gradient in said negative thermal circular lens is from its inner and outer cylindrical surfaces towards its annular central portion.